US011936796B1

(12) United States Patent
Allen et al.

(10) Patent No.: US 11,936,796 B1
(45) Date of Patent: Mar. 19, 2024

(54) PRIVACY PRESERVING ACCOUNT GENERATION

(71) Applicant: Amazon Technologies, Inc., Seattle, WA (US)

(72) Inventors: Nicholas Alexander Allen, Kirkland, WA (US); Matthew Stephen Bullock, Seattle, WA (US); Daniel Ron Simon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 16/714,496

(22) Filed: Dec. 13, 2019

(51) Int. Cl.
  *G06F 21/00* (2013.01)
  *G06F 21/60* (2013.01)
  *H04L 9/30* (2006.01)
  *H04L 9/32* (2006.01)

(52) U.S. Cl.
  CPC .......... *H04L 9/3268* (2013.01); *G06F 21/602* (2013.01); *H04L 9/3073* (2013.01); *H04L 9/3221* (2013.01); *H04L 9/3242* (2013.01)

(58) Field of Classification Search
  CPC ... H04L 9/3268; H04L 9/3242; H04L 9/3073; H04L 9/3221; G06F 21/602
  See application file for complete search history.

(56) References Cited

U.S. PATENT DOCUMENTS

| | | | | |
|---|---|---|---|---|
| 9,813,411 B2 * | 11/2017 | Thibadeau, Sr. | ... | H04L 63/0807 |
| 10,790,984 B1 * | 9/2020 | Stiles | .................... | G06F 16/955 |
| 2005/0223413 A1 * | 10/2005 | Duggan | .............. | G06F 21/6236 726/3 |
| 2010/0325441 A1 * | 12/2010 | Laurie | ................. | H04L 63/0815 713/185 |
| 2011/0302412 A1 * | 12/2011 | Deng | .................. | H04L 63/0407 713/155 |
| 2012/0167189 A1 * | 6/2012 | Aichroth | ............... | H04L 9/3218 726/7 |
| 2013/0073460 A1 * | 3/2013 | Paquin | ................ | G06F 21/6263 705/44 |
| 2013/0073845 A1 * | 3/2013 | Teranishi | .............. | H04L 9/3221 713/175 |
| 2014/0032913 A1 * | 1/2014 | Tenenboym | .......... | H04L 9/3247 715/764 |
| 2014/0281491 A1 * | 9/2014 | Zaverucha | .......... | H04L 63/0421 713/155 |
| 2015/0324604 A1 * | 11/2015 | Roy | .................... | G06F 21/6245 713/164 |

(Continued)

Primary Examiner — Michael M Lee
(74) Attorney, Agent, or Firm — Davis Wright Tremaine LLP

(57) ABSTRACT

Described implementations obtain credential information including an encrypted digital identity (ID). The encrypted digital ID may include a public component of a credential and identity data. Furthermore, the credential information may include cryptographically obfuscated data based on the identity data and a private component of the credential. A proof is obtained that includes proof data. The proof data may confirm that the credential information was correctly generated. Verification of the proof data, and confirmation that the cryptographically obfuscated data is not associated in a collection of cryptographically obfuscated data, cause a computer-implemented service to issue a pseudonym. The pseudonym is usable to generate a relationship associated with a computer-implemented service.

21 Claims, 6 Drawing Sheets

(56) References Cited

U.S. PATENT DOCUMENTS

| | | | | |
|---|---|---|---|---|
| 2016/0140334 A1* | 5/2016 | Forehand | ............... | G06F 21/44 |
| | | | | 726/19 |
| 2017/0033934 A1* | 2/2017 | Camenisch | ........... | G06F 21/125 |
| 2017/0288867 A1* | 10/2017 | Collier | ................... | G06F 21/31 |
| 2017/0366539 A1* | 12/2017 | Bowen | ................. | H04L 9/3268 |
| 2018/0053182 A1* | 2/2018 | Mokhasi | .............. | H04L 63/126 |
| 2018/0167208 A1* | 6/2018 | Le Saint | ............ | H04L 63/0442 |
| 2019/0089547 A1* | 3/2019 | Simplicio, Jr. | ..... | H04W 12/069 |
| 2019/0319939 A1* | 10/2019 | Hamel | ................. | H04L 9/3226 |
| 2019/0333054 A1* | 10/2019 | Cona | ....................... | G06F 21/31 |
| 2020/0127826 A1* | 4/2020 | Ebrahimi | ............. | H04L 9/0894 |
| 2020/0328894 A1* | 10/2020 | Baker | .................. | H04L 9/3271 |
| 2022/0200812 A1* | 6/2022 | Evangelos | ........... | H04L 9/3236 |

* cited by examiner

PRIVACY PRESERVING ACCOUNT GENERATION

BACKGROUND

The Internet is an empowering tool in terms of information, communication, commerce, social interaction, education, and entertainment. It enables individuals to perform activities electronically, such as online shopping, paying bills, electronic banking, and tax declaration. The foregoing are just a few of the countless examples that were only recently performed without the use of computing infrastructure and devices. To maintain the integrity of online systems, increasingly advanced authentication methods have been developed. These methods range from simple passwords to smart cards, biometrics, public-key infrastructures (PKIs) with digital signatures, online authentication mechanisms, and combinations thereof.

Although there exists a wide variety of authentication technologies, virtually all of them involve the disclosure of personal information, which raises numerous privacy and security issues.

BRIEF DESCRIPTION OF THE DRAWINGS

Various techniques will be described with reference to the drawings, in which.

DETAILED DESCRIPTION

Figure 1:
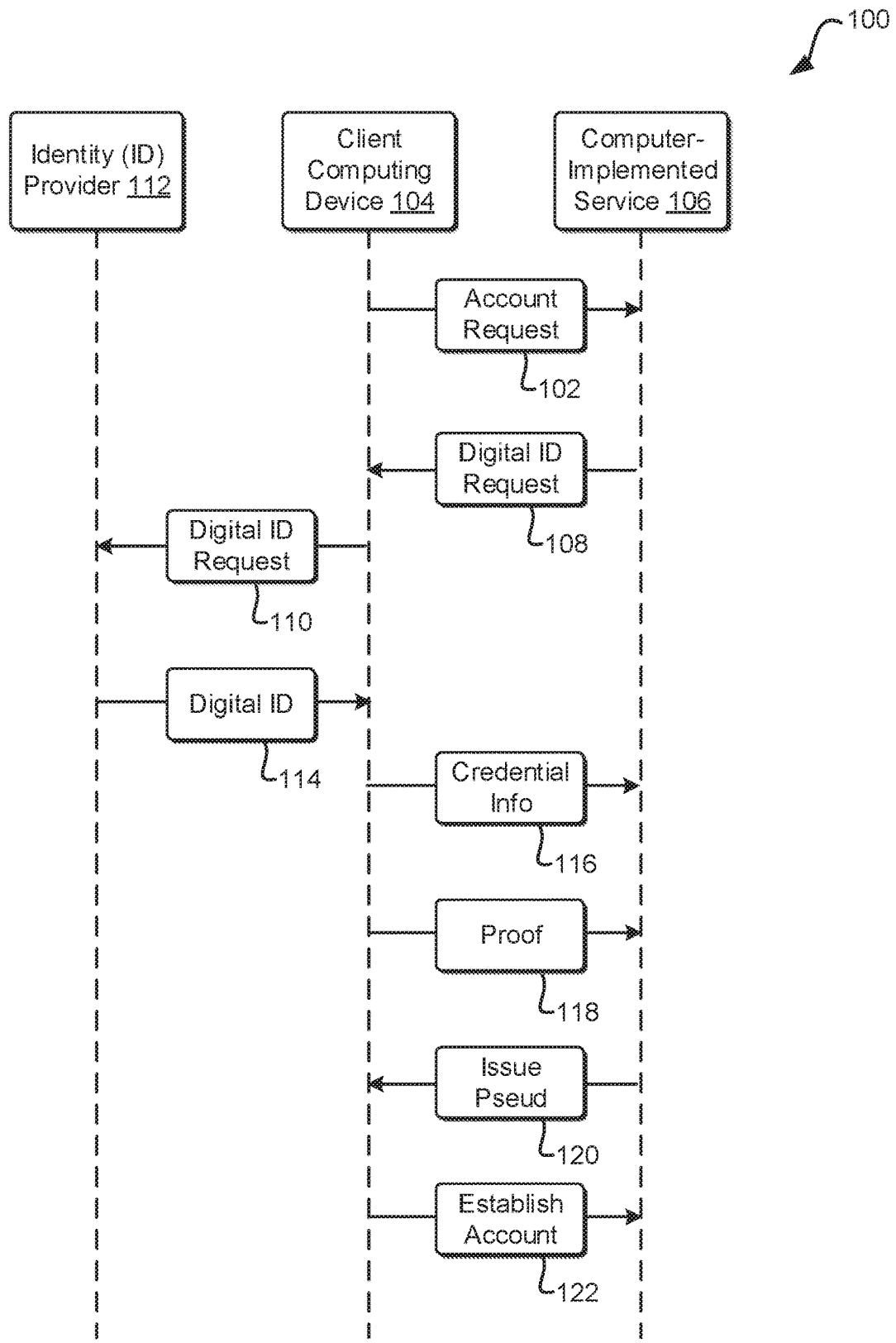
FIG. 1 illustrates a process flow that establishes an account linked to a pseudonym, according to one or more of the described implementations.

This disclosure relates to a computer-implemented authentication process. The authentication process allows an entity, such as a user or company, to remain anonymous when establishing an online account, while concurrently enabling the online account provider to ensure the entity has a valid identity without requiring the entity to disclose that identity. The authentication process enables the entity to use a pseudonym or alias to access the online account, and the authentication process ensures that the entity is not able to create many online accounts linked to separate pseudonyms.

An entity that would like to establish an anonymous online account may contact an identity (ID) provider. After a verification process, the ID provider issues a digital ID to the entity. The digital ID may be in the form of a certificate, such as an X.509 certificate including the properties described in the following. The certificate may include an associated public component of a credential and identity data. The identity data associated with the certificate is the name (e.g., legal name) of the entity. In some implementations, the name associated with the certificate is in a predetermined format, such as a fixed canonical format. The public component of the credential associated with the certificate may be a hash of a secret, such as a secret symmetric key, held by the entity. In some implementations, the secret key is a symmetric key that can be used to encrypt data or to decrypt data that has already been encrypted with the same secret key. In another implementation, the public component of the credential is a public key associated with a private/public key pair that is held by the entity. The certificate issued by the ID provider is signed by the ID provider to certify the authenticity of the certificate.

Using a computing device, the entity establishes a communication session with an online computer-implemented service to establish or generate an anonymous account linked to a pseudonym. The online computer-implemented service may request a digital ID from the entity. The online computer-implemented service may maintain a list of authorized ID providers that the entity may contact to obtain the requested digital ID.

The entity provides the digital ID to the online computer-implemented service. The digital ID may be the certificate described in the foregoing. The entity encrypts the certificate before it is provided to the online computer-implemented service. Therefore, the online computer-implemented service is unable to obtain the user's name from the certificate, and any other private information, such as birthdate or address, that may be associated with the certificate.

In addition to the encrypted certificate, the entity also communicates a cryptographic hash to the online computer-implemented service. The cryptographic hash may be generated from the name associated with the certificate provided by the ID provider and a private component of the credential held by the entity. The private component of the credential may be a private key associated with the private/public key pair held by the entity. Alternatively, the private component of the credential may be the symmetric key that is associated with the hash of the certificate issued by the ID provider. In some implementations, the cryptographic hash generated and provided by the entity is a cryptographic hash of a concatenation (or other combination) of the private component of the credential and the name associated with the certificate provided by the ID provider.

In addition to providing the encrypted certificate and the cryptographic hash, the entity also communicates a proof to the online computer-implemented service. The proof confirms that the encrypted certificate and the cryptographic hash were generated using one or more techniques satisfactory to the online computer-implemented service. Furthermore, the proof confirms that the data associated with the encrypted certificate and the cryptographic hash are linked to the entity and valid. The proof does not reveal anything about the information associated with the decrypted version of the encrypted certificate. Moreover, the proof does not reveal anything about the private component of the credential and the name associated with the certificate, which were used to generate the cryptographic hash. In some implementations, the proof includes an encrypted version of a computation, performed by a computer-implemented circuit for example, that an entity that obtains the proof uses to confirm that the computation is correct.

In some implementations, the proof is a zero-knowledge proof, such as an interactive or non-interactive zero-knowledge proof. For example, the zero-knowledge proof may be generated by a program that accepts private or secret inputs and generates a proof that proves to the online computer-implemented service that the program accepted the inputs as valid and was executed correctly, without revealing anything about the private or secret inputs or the execution of the program. For example, the zero-knowledge proof proves, by way of the encrypted version of a computation that can be verified by an entity that obtains the proof, that the cryptographic hash is in fact a cryptographic hash of the concatenation of a particular encrypted secret and identity name (and, optionally, the online computer-implemented service's name), and that the secret and identity name are certified by the ID provider. Specifically, that a particular (encrypted) string is a valid, signed (by the ID provider) certificate of an identity with the same secret and identity name.

In some implementations, the proof provided by the entity is aided by a circuit, implemented by a computing device in some implementations. In some implementations, the circuit is mutually agreed upon by the entity and the online computer-implemented service. For example, the circuit may be obtained or otherwise received by the entity before the entity generates the encrypted certificate and the cryptographic hash. Similarly, the circuit may be obtained by the online computer-implemented service before the proof is provided by the entity. In some implementations, the online computer-implemented service may communicate the circuit to the entity subsequent to having received the encrypted certificate and the cryptographic hash. In some implementations, the circuit may be generated by the online computer-implemented service or a trusted third-party proving circuit provider. The circuit is used to verify that the cryptographic hash is in fact a cryptographic hash of the concatenation of a particular encrypted secret and identity name, and that a public version of the secret and the identity name are certified by the ID provider. Therefore, the circuit verifies that a particular encrypted string is a valid, signed (by the ID provider) certificate of an identity with the same secret and identity name.

The circuit produces data, such as one or more output values, that is associated with the proof and related proof data provided by the entity. The proof and the associated proof data may be used by the entity to confirm to the online computer-implemented service that the private or secret values associated with the encrypted certificate and the cryptographic hash satisfy a certain set of relationships confirmed by the circuit, without revealing to the online computer-implemented service those private or secret values. The data provided by the circuit may be one or more output values indicating whether or not the certificate and the cryptographic hash were verifiably generated by the entity. Specifically, the circuit may output a true/false statement or value (e.g., 1 or 0). A true statement or value indicates that the certificate and the cryptographic hash were verifiably generated by the entity. A false statement or value indicates that the certificate and the cryptographic hash were not verifiably generated by the entity.

In some implementations, the proof, which may include an encrypted version of computations performed by a circuit and associated proof data, is received by the online computer-implemented service. The proof data may also include circuit data indicating the type or particular circuit that was used to generate the data associated with the proof. In some implementations, the online computer-implemented service uses the circuit data to confirm that the circuit used by the entity is the same type or particular circuit stored by the online computer-implemented service.

After accepting and confirming the proof provided by the entity, the online computer-implemented service searches a database hosted or used by the computer-implemented service to confirm that the cryptographic hash, generated by the entity using the name on the certificate and the private component of the credential, is not already stored in the database. If the cryptographic hash is not in the database, the computer-implemented service issues a pseudonym that may be associated with an account established by the entity and for use with or linked to the online computer-implemented service. In some implementations, the computer-implemented service may issue the pseudonym when the cryptographic hash is already stored in the database. For example, the computer-implemented service may issue the pseudonym when the number of already stored cryptographic hashes is under or equal to a threshold number of stored cryptographic hashes. Furthermore, in some implementations, issuing the pseudonym may involve revoking an already issued or existing pseudonym that is linked to the cryptographic hash. Such a process may occur after the computer-implemented service finds that the cryptographic hash is already stored in the database and linked to an existing pseudonym. Issuing the pseudonym may include accepting a pseudonym chosen by the entity or generating a pseudonym that may be used by the entity.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) protecting private information linked to a user or entity, which directly results in a reduction of computer resources required to investigate malicious behavior that compromises online accounts to obtain personal information retained by online service providers; (2) ensuring that entities may establish a significantly limited number of online accounts associated with pseudonyms, thereby reducing the expenditure of compute resources required to investigate and confirm that pseudonym linked online accounts are linked to unique entities; (3) curtailing the number of pseudonym linked online accounts results in a significant reduction in the consumption of computer-implemented storage; (4) improving the performance of computing devices by providing a computer automated process, that eliminates most human intervention, for validating pseudonym linked accounts associated with unique users; and so forth.

FIG. 1 illustrates a process flow 100 that establishes an account linked to a pseudonym. In some implementations, an identity and other private information associated with an entity establishing the account is not revealed when establishing the account linked to the pseudonym. At 102, a client computing device 104 communicates an account request to a computer-implemented service 106. The account request at 102 indicates that the client computing device 104 desires to establish an account with the computer-implemented service 106, where the account is linked to the pseudonym. Specifically, an entity associated with the client computing device 104, such as an individual or company, does not wish to convey any private information to the computer-implemented service 106 at any moment during and after the account provisioning process performed by the computer-implemented service 106.

In general, requests, messages, or other information communicated between computing devices disclosed herein may comprise data and have a format based on any number of standard protocols used to convey data across a network. For example, communications between the disclosed computing devices may be implemented with XML, HTTP, simple object access protocol (SOAP), representation state transfer (REST) techniques and technologies, and so forth.

At 108, the computer-implemented service 106 requests a digital identity (ID) from the client computing device 104, and in particular, from the entity associated with the client computing device 104. The request at 108 may include a list of approved ID providers that may be used to obtain the digital ID.

At 110, the client computing device 104 communicates a digital ID request 110 to an ID provider 112. The request at 110 causes the ID provider 112 to generate a digital ID. In some implementations, the digital ID is generated after an established identity verification process occurs between the ID provider 112 and the entity requesting the digital ID. The identity verification process may include having the entity provide necessary documents (e.g., birth certificate, incorporation information, and biometric data) that prove their identity. In some implementations, the ID provider 112 may be any certification authority (CA) or other party certified to process entities for identity verification, such as a government agency, a registrar or registry, a third party authorized to manage entity custodial and credential accounts, and so forth.

In some implementations, the digital ID generated by the ID provider 112 includes identity data, such as a name, of the entity. Furthermore, the digital ID may include a public component of a credential associated with the entity. This public component of the credential may be stored in the client computing device 104. In some implementations, the public component of the credential is a public key associated with a public/private key pair linked to the entity. In other implementations, the public component of the credential is a hash of a secret key, such as a symmetric key. At 114, the digital ID generated by the ID provider 112 is communicated to the client computing device 104. In some implementations, the digital ID generated by the ID provider 112 is a certificate including the public component of the credential and the identity data of the entity. In some implementations, the digital ID is an X.509 certificate.

At 116, the client computing device 104 communicates credential information to the computer-implemented service 106. The credential information includes an encryption of the digital ID generated by the ID provider 112. Therefore, the credential information includes an encrypted digital ID. Furthermore, the credential information includes cryptographically obfuscated data. The cryptographically obfuscated data is based on the identity data associated with the digital ID and a private component of the credential. In some implementations, the private component of the credential is a private key associated with the public/private key pair linked to the entity. In other implementations, the private component of the credential is the secret key, such as the symmetric key. Once the data is obfuscated, an entity receiving the cryptographically obfuscated data is unable to determine the identity data associated with the digital ID and the private component of the credential. In some implementations, the cryptographically obfuscated data is a cryptographic hash of the identity data and the private component of the credential. The cryptographic hash may be generated by an algorithm that produces a unique string that conceals the identity data and the private component of the credential. The client computing device 104 may generate the cryptographically obfuscated data (e.g., the cryptographic hash) based on the identity data and the private component of the credential. In some implementations, the cryptographically obfuscated data is based on a concatenation of the identity data and the private component of the credential.

Encryption as used herein may refer to, but is not limited to, processes of encoding messages or information in such a way that only authorized parties can read it. This includes, but is not limited to, symmetric key encryption and public-key encryption.

At 118, a proof from the client computing device 104 is communicated to the computer-implemented service 106. The proof from the client computing device 104 may be communicated concurrently with the credential information communicated at 116. The proof communicated at 118 may include an encrypted version of one or more computations usable to confirm that the encrypted digital ID and the cryptographically obfuscated data were generated using one or more techniques satisfactory to the computer-implemented service 106. Furthermore, the proof confirms that the data associated with the encrypted digital ID and the cryptographically obfuscated data are linked to the entity and valid. The proof does not reveal anything about the information associated with the decrypted version of the encrypted digital ID. Moreover, the proof does not reveal anything about the private component of the credential and the name associated with the digital ID, which were used to generate the cryptographic hash.

In some implementations, the proof is a zero-knowledge proof, such as an interactive or non-interactive zero-knowledge proof, generated by a program that accepts private or secret inputs and generates a proof, including in some implementations at least the encrypted version of one or more computations, to prove to the computer-implemented service 106 that the program accepted the inputs as valid and was executed correctly, without revealing anything about the private or secret inputs or the execution of the program. In some implementations, the zero-knowledge proof proves the cryptographic hash is in fact a cryptographic hash of the concatenation of a particular (encrypted) secret and identity name (and, optionally, the computer-implemented service's 106 name), and that the secret and identity name are certified by the ID provider 112. That is, that a particular (encrypted) string is a valid, signed (by the ID provider 112) certificate of an identity with the same secret and identity name.

In some implementations, the proof provided by the client computing device 104 is aided by a circuit, implemented by a computing device in some implementations. In some implementations, the circuit is mutually agreed upon by the client computing device 104 and the computer-implemented service 106. For example, the circuit may be obtained or otherwise received by the client computing device 104 before the entity generates the encrypted digital ID and the cryptographically obfuscated data. Similarly, the circuit may be obtained by the computer-implemented service 106 before the proof is provided by the entity via the client computing device 104. In another implementation, the computer-implemented service 106 may communicate the circuit to the client computing device 104 subsequent to having received the encrypted digital ID and the cryptographically obfuscated data to challenge the veracity of the encrypted digital ID and the cryptographically obfuscated data. In some implementations, the circuit may be generated by the computer-implemented service 106. The circuit is used to verify that the cryptographic hash is in fact a cryptographic hash of the concatenation of a particular encrypted secret and identity name, and that a public version of the secret and the identity name are certified by the ID provider. Therefore, the circuit verifies that a particular encrypted string is a valid, signed (by the ID provider) certificate of an identity with the same secret and identity name.

In some implementations, the circuit held by both the client computing device 104 and the computer-implemented service 106. The circuit, embodied as the computer-implemented program, comprises a virtual construction of arithmetic gates connected by wires. The circuit performs integer operations and has no data dependent loops that can reveal private or secret data input (e.g., the digital ID and secret key data) into the circuit.

The circuit produces data that is included with the proof data, such as one or more output values, that is associated with the proof provided by the client computing device 104. Therefore, in some implementations, the proof and associated proof data include an encrypted version of one or more computations performed by the circuit and the data generated by the circuit. The proof and the associated proof data may be used by the entity to confirm to the computer-implemented service 106 that the private or secret values associated with the encrypted digital ID and the cryptographically obfuscated data satisfy a certain set of relationships confirmed by the circuit, without revealing to the computer-implemented service 106 those private or secret values. Therefore, the proof and proof data are devoid of information usable to obtain the private or secret values associated with the encrypted digital ID and the cryptographically obfuscated data. The data provided by the circuit may be one or more output values indicating whether or not the certificate and the cryptographic hash were verifiably generated by the entity. Specifically, the circuit may output a true/false statement or value (e.g., 1 or 0). A true statement or value indicates that the certificate and the cryptographic hash were verifiably generated by the entity. A false statement or value indicates that the certificate and the cryptographic hash were not verifiably generated by the entity.

In some implementations, the proof and associated proof data received by the computer-implemented service 106 include circuit data indicating the type or particular circuit that was used to generate the proof data. In some implementations, the online computer-implemented service uses the circuit data to confirm that the circuit used by the entity is the same type or particular circuit stored by the online computer-implemented service.

After accepting and confirming the proof provided by the client computing device 104, the computer-implemented service 106 searches a database hosted or used by the computer-implemented service 106 to confirm that the cryptographically obfuscated data is not already included in the database. If the cryptographically obfuscated data is not found in the database, the computer-implemented service 106, at 120, issues a pseudonym to the entity associated with the client computing device 104. In some implementations, the computer-implemented service 106 may issue the pseudonym when the cryptographically obfuscated data is already stored in the database. For example, the computer-implemented service 106 may issue the pseudonym when the number of already stored cryptographically obfuscated data is under or equal to a threshold number, such as five (5), of stored cryptographically obfuscated data. Furthermore, in some implementations, issuing the pseudonym may involve revoking an already issued or existing pseudonym that is linked to the cryptographically obfuscated data. Such a process may occur after the computer-implemented service 106 determines that the cryptographically obfuscated data is already stored in the database and linked to an existing pseudonym. As indicated, the pseudonym is issued only after verification of the proof at 118. The issued pseudonym may be autonomously generated by the computer-implemented service 106. In some implementations, the issued pseudonym may be chosen by the entity associated with the client computing device 104.

At 122, the entity associated with the client computing device 104 may use the pseudonym provided by the computer-implemented service 106 to establish an account with the computer-implemented service 106.

Figure 2:
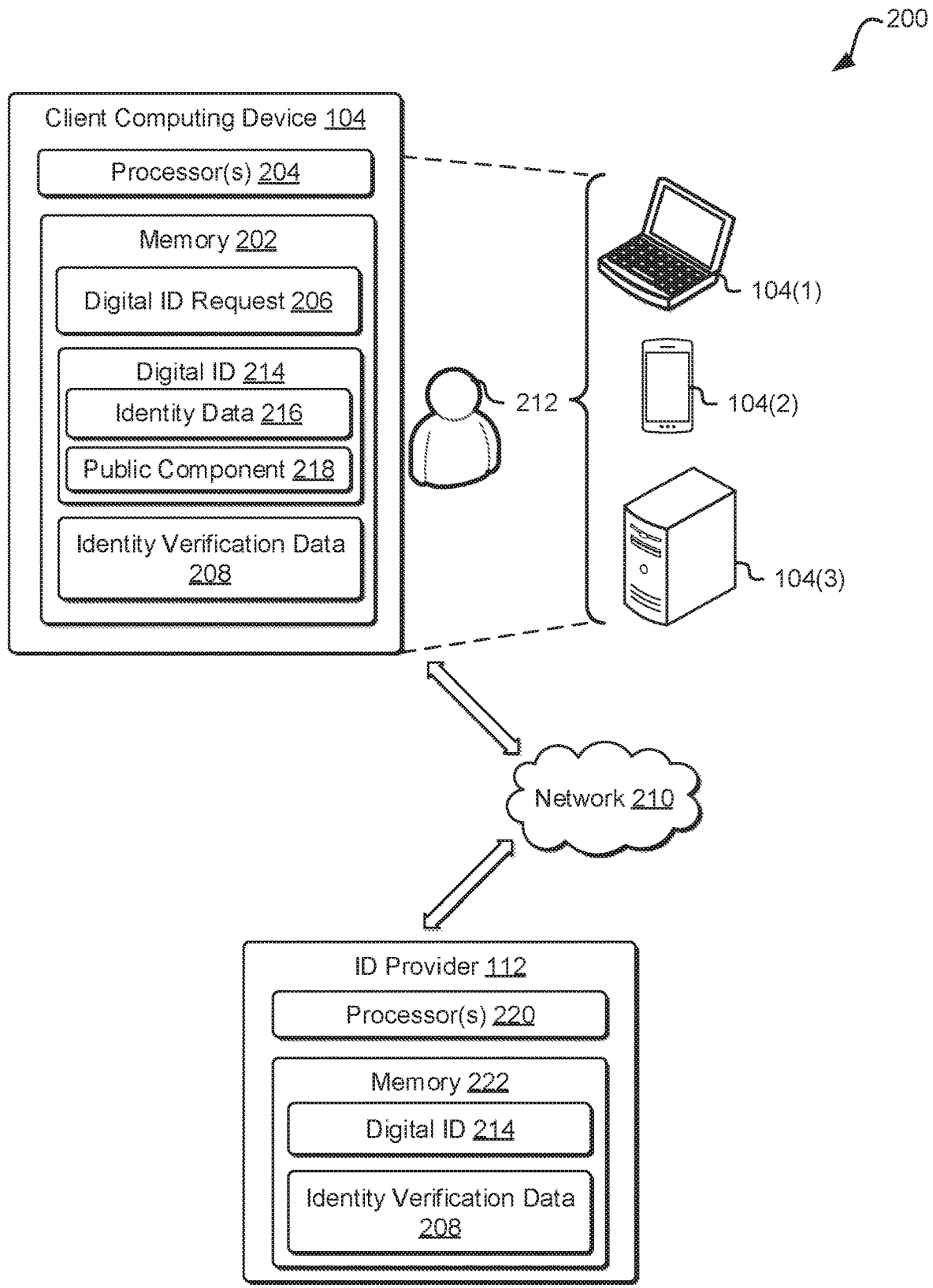
FIG. 2 illustrates details associated with a client computing device that may be used to obtain a pseudonym for use in establishing an account with a computer-implemented service.

FIG. 2 illustrates details 200 associated with the client computing device 104 that may be used to obtain a pseudonym for use in establishing an account with the computer-implemented service 106. In one configuration, the client computing device 104 may include at least one memory 202 and one or more processing units (or processor(s)) 204. The processor 204 may be implemented as appropriate in hardware, computer-executable instructions, firmware, or combinations thereof. Computer-executable instructions or firmware implementations of the processor 204 may include computer-executable or machine-executable instructions written in any suitable programming language to perform the various described functions.

The memory 202 may store program instructions that are loadable and executable on the processor 204, as well as data generated or used during the execution of these program instructions. Depending on the configuration and type of the service provider computing device 106, the memory 202 may be volatile (such as random access memory (RAM)) and/or non-volatile (such as read-only memory (ROM), flash memory, etc.). The service provider computing device 106 may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules, program services and other data for the client computing device 104. In some implementations, the memory 202 may include multiple different types of memory, such as static random access memory (SRAM), dynamic random access memory (DRAM), or ROM.

Alternatively, computer-readable communication media may include computer-readable instructions, program modules, or other data transmitted within a data signal, such as a carrier wave, or other transmission. However, as used herein, computer-readable storage media does not include computer-readable communication media.

The client computing device 104 may also contain communications connection(s) that allow the client computing device 104 to communicate with a storage database, another computing device or server, user terminals and/or other devices on networks, such as networks associated with the computer-implemented service 106 and/or other networks external to the computer-implemented service 106. The client computing device 104 may also include input/output (I/O) device(s), such as a keyboard, a mouse, a pen, a voice input device, a touch input device, a display, speakers, a printer, etc. Furthermore, the client computing device 104 may be implemented as a laptop computer 104(1), mobile device 104(2), and/or desktop computer 104(3). The client computing device 104 may take other forms as well.

The client computing device 104 generates a digital ID request 206. The digital ID request 206 may convey identity verification data 208 to the ID provider 112. The identity verification data 208 may be conveyed to the ID provider 112 over a network 210. As illustrated, the ID provider 112 includes a processor(s) 220 and a memory 222. In an embodiment, the network 210 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 210 is enabled by wired and/or wireless connections and combinations thereof. In an embodiment, the network 210 includes the Internet and/or other publicly addressable communications network, as the system may include a web server for receiving requests and serving content in response thereto, although for other networks an alternative device serving a similar purpose could be used as would be apparent to one of ordinary skill in the art. The identity verification data 208 may include, among other things, necessary documents (e.g., birth certificate, incorporation information, and biometric data) that may be used by the identity provider 112 to confirm the entity's identity, such as a user 212 seeking to establish an online account associated with a pseudonym.

In response to receiving the identity verification data 208 and the digital ID request 206, the ID provider 112 generates a digital ID 214. The digital ID 214 is signed by the ID provider 112 and communicated to the client computing device 104 using the network 210. The digital ID 214 is stored in the memory 202 of the client computing device 104. The ID provider 112 may also retain the digital ID 214 in the memory 222. In some implementations, the digital ID 214 is a signed certificate provided by the ID provider 112. In some implementations, the digital ID 214 is an X.509 certificate.

The digital ID 214 may include a plurality of components. In some implementations, the digital ID 214 includes identity data 216 and a public component of a credential 218. The public component of the credential 218 may have been conveyed to the ID provider 112 as part of the digital ID request 206 and for incorporation by the ID provider 112 with the digital ID 214. In some implementations, the public component of the credential 218 is a public key associated with a public/private key pair linked to the user 212 and stored in the memory 202. In other implementations, the public component of the credential 218 is a hash of a secret key, such as a symmetric key, stored in the memory 202.

In some implementations, the identity data 216 associated with the digital ID 214 is the name (e.g., legal name) of the user 212. In some implementations, the name associated with the digital ID 214 is in a predetermined format, such as a fixed canonical format.

Figure 3:
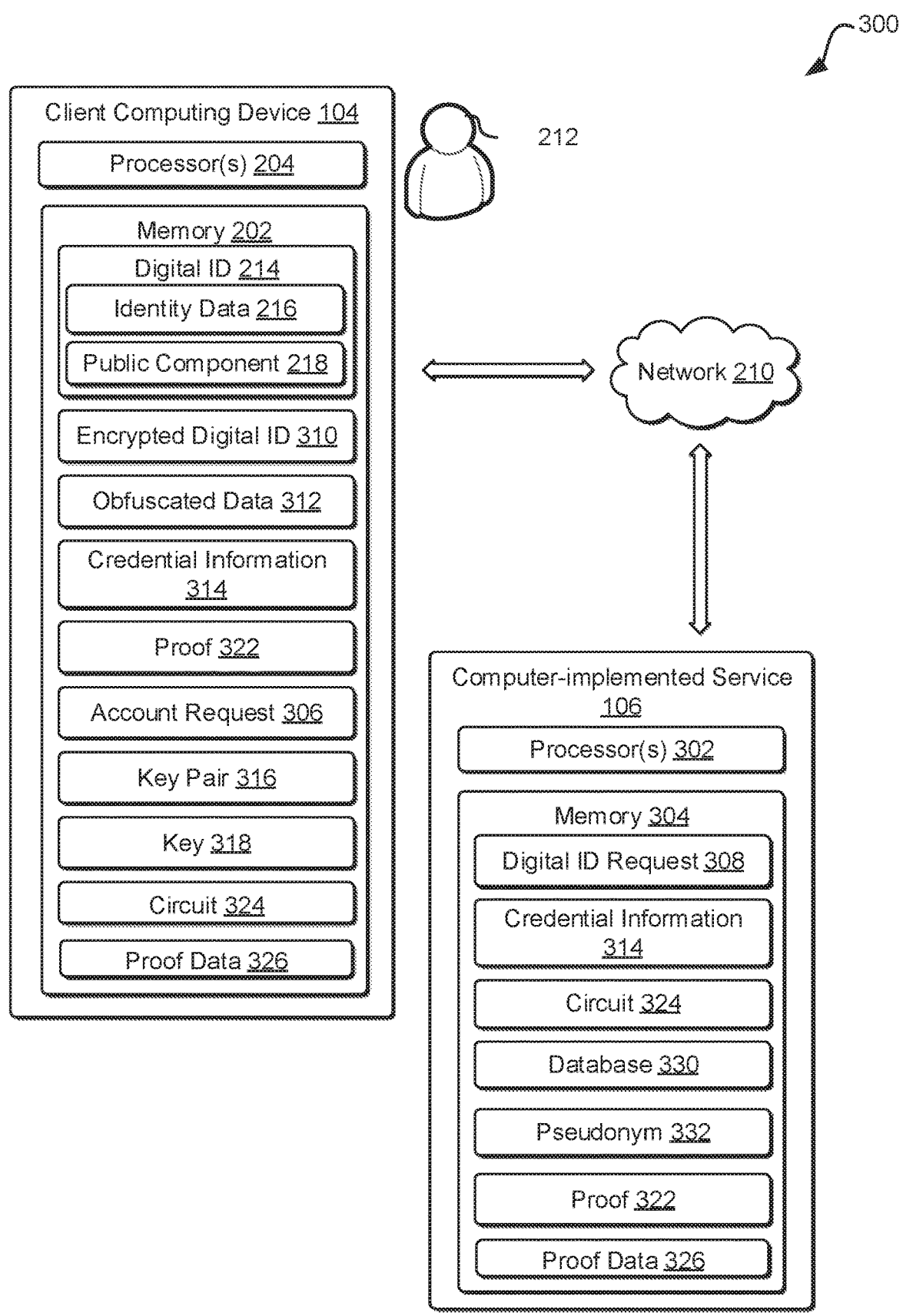
FIG. 3 illustrates details associated with the client computing device and a computer-implemented service, according to one or more of the described implementations.

FIG. 3 illustrates details 300 associated with the client computing device 104 and the computer-implemented service 106, according to one or more of the described implementations. Similar to the client computing device 104, the computer-implemented service 106 may include a processor(s) 302 and a memory 304.

The client computing device 104 generates an account request 306. Specifically, the user 212 may generate the account request 306 and indicate in the account request 306 that they would like to remain anonymous and therefore establish an account with a pseudonym. The account request 306 is communicated to the computer-implemented service 106. The computer-implemented service 106 may be an online computer-implemented service that provides various services, such as merchandise for purchase, distributed storage services, network-based infrastructure, and so forth. An account established with the computer-implemented service 106 allows an entity associated with the account to gain access to the various services and so forth provided by the computer-implemented service 106. Accounts and information associated with the accounts may be stored in one or more storages associated with the computer-implemented service 106.

In response to the account request 306 received from the client computing device 104, the computer-implemented service 106 generates a digital ID request 308. The digital ID request 308 specifies that the user 212 is required to provide a digital ID and obfuscated information. The digital ID request 308 may also include a list of approved ID providers that may be used to obtain the requested digital ID. The computer-implemented service 106 communicates, over the network 210, the digital ID request 308 to the client computing device 104.

The client computing device 104 confirms that the digital ID 214 was generated by one of the approved ID providers included with the digital ID request 308. The client computing device 104 may request a new digital ID when the digital ID 214 was not generated by one of the approved ID providers included in the digital ID request 308.

In response to receiving the digital ID request 308, the client computing device 104 encrypts the digital ID 214 to generate an encrypted digital ID 310. In addition, the client computing device 104 generates cryptographically obfuscated data 312. Subsequently, the client computing device 104 generates credential information 314. The credential information 314 includes the encrypted digital ID 310 and the cryptographically obfuscated data 312.

The cryptographically obfuscated data 312 is based on the identity data 216 associated with the digital ID 214 and a private component of a credential. In some implementations, the private component of the credential is a private key associated with the public/private key pair 316 linked to the user 212. In other implementations, the private component of the credential is a secret key 318, such as a symmetric key. Once the data is obfuscated, an entity receiving the cryptographically obfuscated data 312 is unable to determine the identity data 216 associated with the digital ID 214 and the private component of the credential. In some implementations, the cryptographically obfuscated data 312 is a cryptographic hash of the identity data 216 and the private component of the credential. The client computing device 104 may generate the cryptographically obfuscated data 312 using a cryptographic hash of the identity data 216 and the private component of the credential. In some implementations, the cryptographically obfuscated data 312 is based on a cryptographic hash of a concatenation of the identity data 216 and the private component of the credential. The cryptographically obfuscated data 312 or cryptographic hash may be generated by an algorithm that produces a unique string that conceals the identity data 216 and the private component of the credential.

The client computing device 104 communicates the credential information 314 to the computer-implemented service 106. Furthermore, the client computing device 104 communicates a proof 322 to the computer-implemented service 106. The proof 322 from the client computing device 104 may be communicated concurrently with the credential information 314. The proof 322 confirms that the encrypted digital ID 310 and the cryptographically obfuscated data 312 were generated using one or more techniques satisfactory to the computer-implemented service 106. Furthermore, the proof 322 confirms that the data associated with the encrypted digital ID 310 and the cryptographically obfuscated data 312 are valid. The proof 322 does not reveal anything about the information associated with the decrypted version (e.g., digital ID 214) of the encrypted digital ID. Moreover, the proof 322 does not reveal anything about the private component of the credential and the name associated with the digital ID 214, which were used to generate the cryptographically obfuscated data 312. In some implementations, the proof 322 comprises an encrypted version of one or more computations performed by a computer-implemented circuit that computes the validity of the digital ID 214 and the cryptographically obfuscated data 312.

In some implementations, the proof 322 is an interactive or non-interactive zero-knowledge proof. The proof 322 may be generated by a program that accepts private or secret inputs and generates a proof to prove to the computer-implemented service 106 that the program accepted the inputs as valid and was executed correctly, without revealing anything about the private or secret inputs or the execution of the program. In some implementations, the zero-knowledge proof proves the cryptographic hash, for example the cryptographically obfuscated data 312, is in fact a cryptographic hash of the concatenation of a particular (encrypted) secret 318 and identity name 216 (and, optionally, the computer-implemented service's 106 name), and that the secret 318 and identity name 316 are certified by the ID provider 112. That is, that a particular (encrypted) string is a valid, signed (by the ID provider 112) certificate of an identity with the same secret 318 and identity name 216. In some implementations, the digital ID 214 is an X.509 certificate. In another implementation, the proof 322 may be generated interactively based on a series of challenges from the computer-implemented service 106 and responses to those challenges provided by the client computing device 104.

In some implementations, the proof 322 provided by the client computing device 104 is aided by a circuit 324, implemented by a computing device in some implementations. In some implementations, the circuit 324 is mutually agreed upon by the client computing device 104 and the computer-implemented service 106. For example, the circuit 324 may be obtained or otherwise received by the client computing device 104 before the user 212 generates the encrypted digital ID 310 and the cryptographically obfuscated data 312. Similarly, the circuit 324 may be obtained or otherwise received by the computer-implemented service 106 before the proof 322 is provided by the user 212 via the client computing device 104. In another implementation, the computer-implemented service 106 may communicate the circuit 324 to the client computing device 104 subsequent to having received the encrypted digital ID 310 and the cryptographically obfuscated data 312. In some implementations, the circuit 324 may be generated by the computer-implemented service 106, or a third-party mutually agreed upon by operators of the computer-implemented service 106 and the client computing device 104.

In some implementations, the circuit 324 is held by both the client computing device 104 and the computer-implemented service 106. The circuit 324, embodied as the computer-implemented program, comprises a virtual construction of arithmetic gates connected by wires. The circuit 324 performs integer operations and has no data dependent loops that can reveal private or secret data input (e.g., the digital ID and secret key data) into the circuit 324.

The circuit 324 produces data that is associated with proof data 326, such as one or more output values. The proof data 326 may also include data associated with an encrypted version of the circuit 324 and/or the computation performed by the circuit 324 that may be used by the computer-implemented service 106 to confirm and validate the output provided by the circuit 324. In some implementations, the proof 322, including the encrypted version of the computation and proof data 326, may be used by the user 212 to prove to the computer-implemented service 106 that the private or secret values associated with the encrypted digital ID 310 and the cryptographically obfuscated data 312 satisfy a certain set of relationships confirmed by the circuit 324, without revealing to the computer-implemented service 106 those private or secret values. Therefore, the proof 322, including the associated computation data and proof data 326, is devoid of information usable to obtain the private or secret values associated with the encrypted digital ID 310 and the cryptographically obfuscated data 312.

In some implementations, the proof 322, including the associated proof data 326, is obtained or otherwise received by the computer-implemented service 106. The proof data 326 may also include circuit data indicating the type or particular circuit (e.g., circuit 324) that was used to generate the at least some of the data associated with the proof data 326. In some implementations, the online computer-implemented service 106 uses the circuit data to confirm that the circuit 324 used by client computing device 104 is the same type or particular circuit 324 stored by the online computer-implemented service 106.

After obtaining and verifying the proof 322 provided by the client computing device 104, the computer-implemented service 106 searches a database 330 hosted or used by the computer-implemented service 106 to confirm that the cryptographically obfuscated data 312 is not already in the database 330. If the cryptographically obfuscated data 312 is not in the database, the computer-implemented service 106, at 120, issues a pseudonym 332 to the user 212 associated with the client computing device 104. In some implementations, the computer-implemented service 106 may issue the pseudonym 332 when the cryptographically obfuscated data 312 is already stored in the database 330. For example, the computer-implemented service 106 may issue the pseudonym 332 when the number of already stored cryptographically obfuscated data 312 is under or equal to a threshold number, such as five (5), of stored cryptographically obfuscated data 312. Furthermore, in some implementations, issuing the pseudonym 332 may involve revoking an already issued or existing pseudonym that is linked to the cryptographically obfuscated data 312. Such a process may occur after the computer-implemented service 106 determines that the cryptographically obfuscated data 312 is already stored in the database 330 and linked to an existing pseudonym. As indicated, the pseudonym 332 is issued only after verification of the proof 322. The issued pseudonym 332 may be autonomously generated by the computer-implemented service 106. In some implementations, the issued pseudonym 332 may be chosen by the user 212 associated with the client computing device 104.

The user 212 associated with the client computing device 104 may use the pseudonym 332 provided by the computer-implemented service 106 to establish an account with the computer-implemented service 106.

Figure 4:
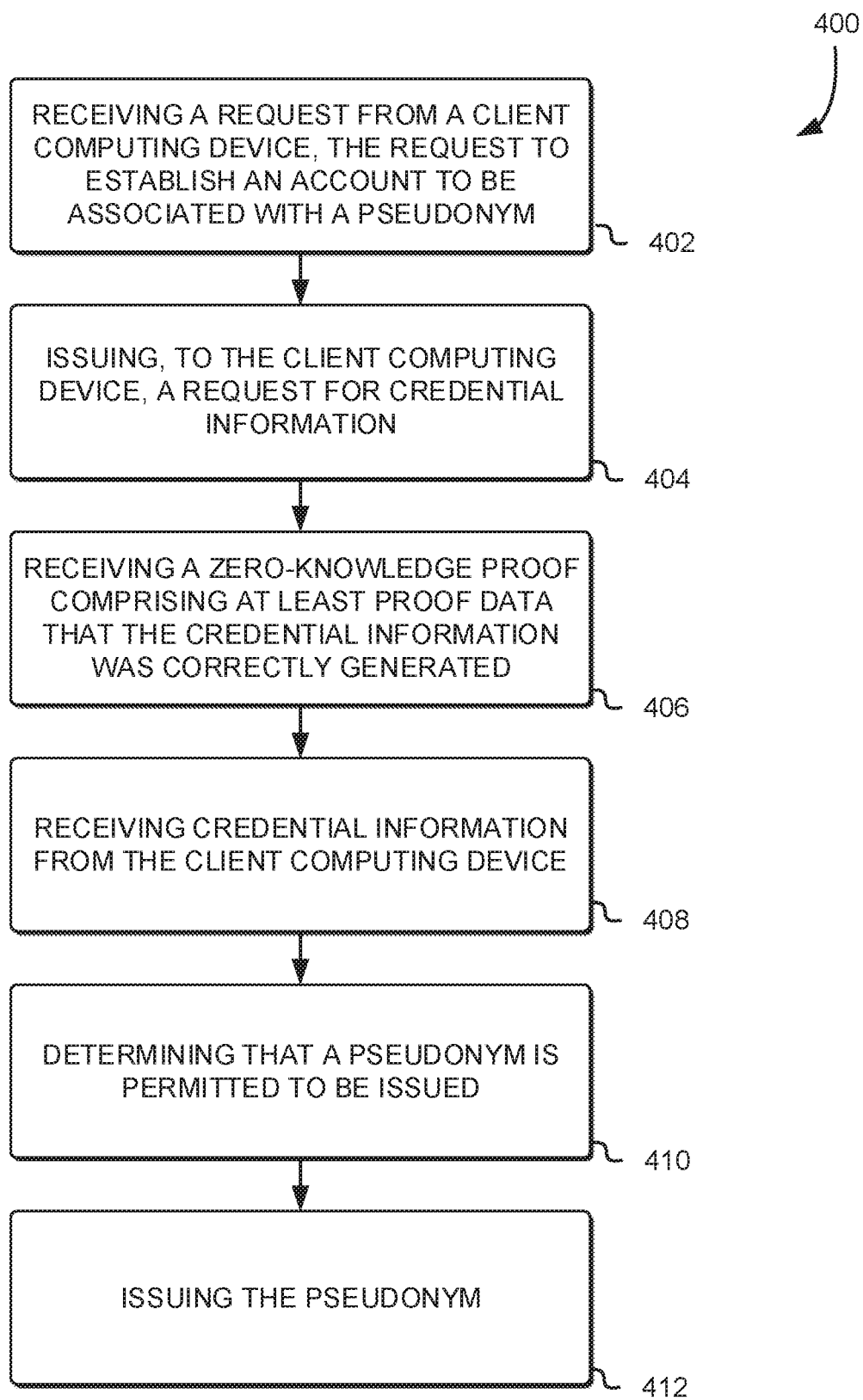
FIG. 4 illustrates a flow diagram including various processing acts, implemented by a system environment with one or more computing devices, which provide account provisioning associated with a pseudonym.

FIG. 4 illustrates a flow diagram 400 including various processing acts, implemented by a system environment with one or more computing devices, which provide entity account provisioning associated with a pseudonym. In some implementations, the acts of the flow diagram 400 are executed by one or more computing devices illustrated in FIGS. 1-3 and 6. The illustrated computing devices may execute computer-executable instructions incorporating at least some of the processing acts of the flow diagram 400 to provide entity account provisioning associated with a pseudonym.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 402, a request is received from a client computing device, for example, the client computing device 104. The request may be received by the computer-implemented service 106. The request may be to establish an account to be associated with a pseudonym. The account is to be used with an online computer-implemented service, such as the computer-implemented service 106. In some implementations, the online computer-implemented service obtains the request.

At 404, a request for credential information is issued. The request for credential information may be issued by the computer-implemented service 106 and received by the client computing device 104.

At 406, credential information is obtained or otherwise received. The credential information may be obtained by the computer-implemented service 106. The credential information may include an encrypted certificate including a public component of a credential and identity data in a predetermined format. The credential information may further include a cryptographic hash based on the identity data and a private component of the credential. In some implementations, a certificate provided by the ID provider 112 is encrypted to generate the encrypted certificate. Furthermore, in some implementations, the cryptographic hash is generated by the client computing device 104. The cryptographic hash may be generated by an algorithm that produces a unique string that conceals the identity data and the private component of the credential. In some implementations, the certificate is an X.509 certificate.

At 408, a zero knowledge proof is obtained or otherwise received. The zero knowledge proof may include proof data that the credential information was correctly generated, for example by the client computing device 104. The zero knowledge proof may be obtained or otherwise received by the computer-implemented service 106. The proof data is devoid of information usable to obtain the private or secret values associated with the credential information.

At 410, it is determined that a pseudonym is permitted to be issued. For example, the computer-implemented service 106 may access a database to confirm the cryptographic hash is not already stored in the database, before determining that the pseudonym may be issued.

At 412, the pseudonym is issued. The pseudonym may be issued to the client computing device 104 by the computer-implemented service 106. The pseudonym may be associated with an account maintained in a database associated with the computer-implemented service 106.

Figure 5:
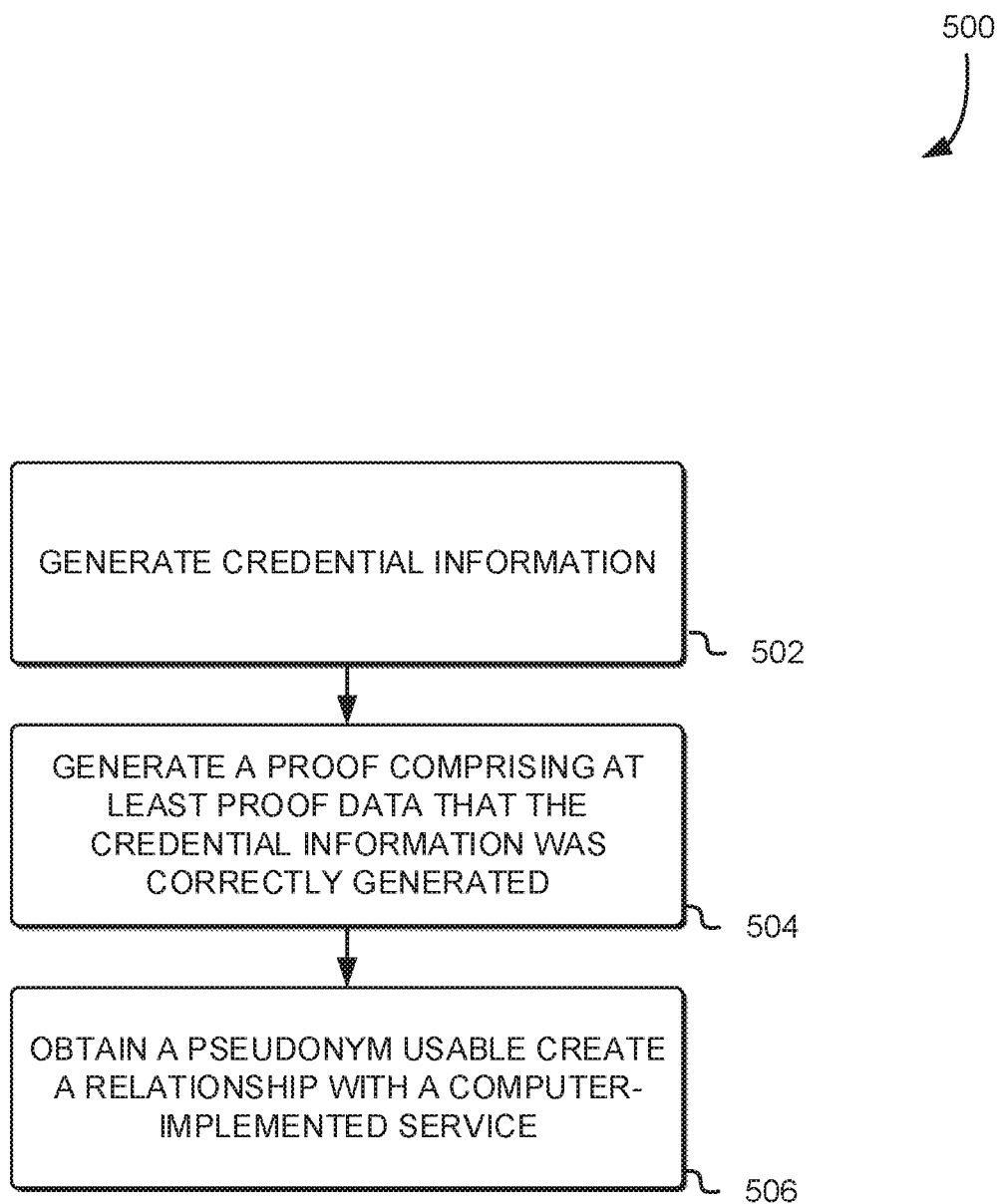
FIG. 5 illustrates another flow diagram including various processing acts, implemented by a system environment with one or more computing devices, which provide account provisioning associated with a pseudonym.

FIG. 5 illustrates a flow diagram 500 including various processing acts, implemented by a system environment with one or more computing devices, which provide entity account provisioning associated with a pseudonym. In some implementations, the acts of the flow diagram 500 are executed by one or more computing devices illustrated in FIGS. 1-3 and 6. The illustrated computing devices may execute computer-executable instructions incorporating at least some of the processing acts of the flow diagram 500 to provide entity account provisioning associated with a pseudonym.

At 502, credential information is generated. In some implementations, the client computing device 104 generates the credential information. The credential information may comprise an encrypted digital ID including a public component of a credential and identity data. The credential information may further include a cryptographic hash based on the identity data and a private component of the credential. In some implementations, a certificate provided by the ID provider 112 is encrypted to generate the encrypted digital ID. Furthermore, in some implementations, the cryptographic hash is generated by the client computing device 104. The cryptographic hash may be generated by an algorithm that produces a unique string that conceals the identity data and the private component of the credential. In some implementations, the certificate is an X.509 certificate.

At 504, a proof is generated. The proof may be generated by the client computing device 104. The proof may include proof data that the credential information was correctly generated. Moreover, the proof data is devoid of information usable to obtain decrypted information associated with the encrypted digital ID or the private component of the credential. In some implementations, the client computing device 104 generates a proof.

At 506, a pseudonym is obtained or otherwise received. The obtained pseudonym is usable to create a relationship with a computer-implemented service, such as the computer-implemented service 106. The relationship may be an account established with the computer-implemented service.

Figure 6:
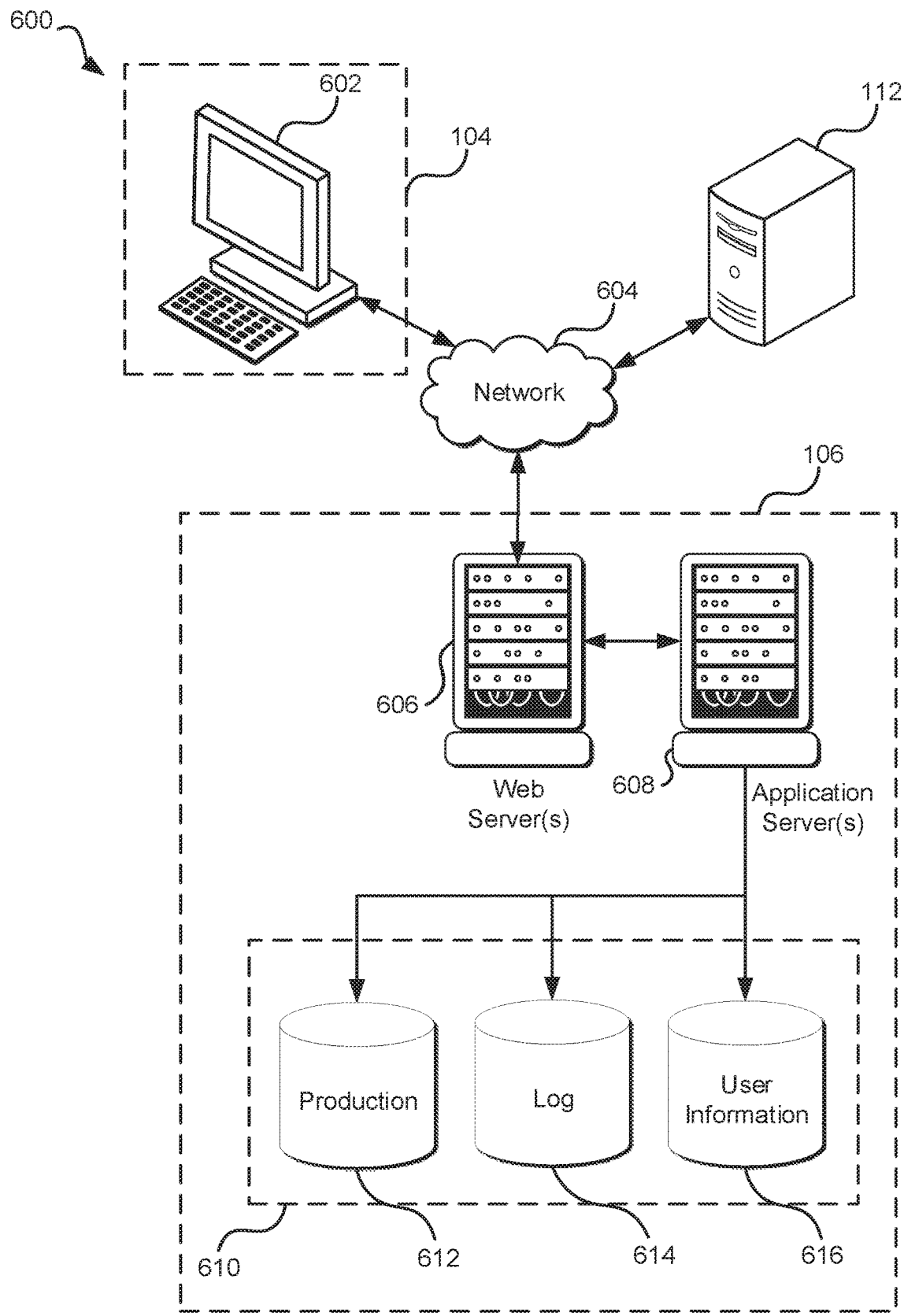
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. In some implementations, the client device 602 is implemented as the client computing device 104 depicted in FIGS. 1-3. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art. In some implementations, the web server 606 is implemented as the computer-implemented service 106 depicted in FIG. 1 and FIG. 3. The example system 600 may also comprise the ID provider 112 depicted in FIGS. 1-2. As described, the client computing device 104 may communicate with the ID provider 112 to obtain the digital ID 214. Furthermore, the client computing device 104 may communicate with the computer-implemented service 106 to establish an online account that is linked to a pseudonym 332, according to one or more of the described implementations.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a request from a client computing device, the request from the client computing device to establish an account to be associated with a pseudonym, the account to be used with an online computer-implemented service that received the request from the client computing device;
   issuing, to the client computing device, a request for credential information;
   receiving the credential information from the client computing device, the credential information comprising an encrypted certificate generated from encrypting a public component of a credential and identity data in a predetermined format, and the credential information further comprising a cryptographic hash based on the identity data and a private component of the credential, wherein the cryptographic hash conceals at least the identity data and the private component of the credential, the identity data comprising data identifying an individual or entity seeking to establish the account to be associated with the pseudonym;
   receiving a zero-knowledge proof comprising at least proof data indicating that the credential information was correctly generated by the client computing device, the proof data of the zero-knowledge proof confirming that the identity data was certified by an identity (ID) provider that issued a decrypted version of the encrypted certificate, and the proof data of the zero-knowledge proof further confirming that the cryptographic hash is based on the identity data and the private component of the credential;
   determining, using a database usable by the online computer-implemented service, that the pseudonym is permitted to be issued based on the cryptographic hash; and
   issuing the pseudonym to be associated with the account in the database.

2. The computer-implemented method according to claim 1, wherein the public component of the credential is a public key associated with a public/private key pair held by the client computing device or a hash of a symmetric key held by the client computing device, and wherein the encrypted certificate is based on a certificate generated and signed by the ID provider, the ID provider approved by the online computer-implemented service.

3. The computer-implemented method according to claim 1, wherein the predetermined format associated with the identity data comprises a predetermined canonical representation including a name associated with an individual or entity, and wherein the determining comprises confirming the cryptographic hash is not in the database usable by the online computer-implemented service.

4. The computer-implemented method according to claim 1, wherein the private component of the credential is a private key associated with a public/private key pair held by the client computing device or a symmetric key held by the client computing device.

5. A system, comprising:
   one or more processors; and
   memory that stores computer-executable instructions that are executable by the one or more processors to cause the system to:
   obtain credential information comprising an encrypted digital identity (ID) generated from encrypting a public component of a credential and encrypting identity data, the credential information further comprising cryptographically obfuscated data based on the identity data and a private component of the credential;
   obtain a proof comprising at least proof data that the credential information was correctly generated, the proof and the associated proof data being devoid of information usable to obtain private information associated with the credential information; and
   based on at least the credential information and the proof, issue a pseudonym usable to generate a relationship associated with a computer-implemented service of at least one system.

6. The system according to claim 5, wherein the cryptographically obfuscated data is a cryptographic hash of the identity data and the private component of the credential.

7. The system according to claim 5, wherein the computer-executable instructions that are executable by the one or more processors further to cause the system to verify the cryptographically obfuscated data is not already associated with a collection of cryptographically obfuscated data, and wherein the pseudonym is issued subsequent to verifying the cryptographically obfuscated data is not already associated with the collection of cryptographically obfuscated data.

8. The system according to claim 5, wherein the proof data comprises data generated by a circuit that received data associated with a decrypted version of the encrypted digital ID or the private component of the credential.

9. The system according to claim 5, wherein the proof is a non-interactive zero-knowledge proof.

10. The system according to claim 5, wherein the proof is an interactive zero-knowledge proof.

11. The system according to claim 5, wherein the public component of the credential is a public key associated with a public/private key pair or a hash of a symmetric key, and wherein the encrypted digital ID is based on a certificate generated and signed by an ID provider associated with a list including a plurality of approved ID providers.

12. The system according to claim 5, wherein the identity data comprises a predetermined canonical representation including a name associated with an individual or entity.

13. The system according to claim 5, wherein the private component of the credential is a private key of a public/private key pair or a symmetric key.

14. A non-transitory computer-readable storage medium storing thereon executable instructions that, as a result of being executed by one or more processors of a computer system, cause the computer system to at least:
   generate credential information comprising an encrypted digital identity (ID) generated from encrypting a public component of a credential and identity data, the credential information further comprising a cryptographic hash based on the identity data and a private component of the credential;
   generate a proof comprising proof data that the credential information was correctly generated, the proof and the associated proof data being devoid of information usable to obtain decrypted information associated with the encrypted digital ID or the private component of the credential; and
   obtain a pseudonym usable to create a relationship with a computer-implemented service, wherein the computer-implemented service provides the pseudonym at least based on the credential information and the proof.

15. The non-transitory computer-readable storage medium of claim 14, wherein the instructions further comprise instructions that, as a result of being executed by the one or more processors, cause the computer system to generate the cryptographic hash from a concatenation of the identity data and the private component of the credential.

16. The non-transitory computer-readable storage medium of claim 14, wherein the proof data comprises data generated by a circuit that received data associated with a decrypted version of the encrypted digital ID or the private component of the credential.

17. The non-transitory computer-readable storage medium of claim 14, wherein the instructions further comprise instructions that, as a result of being executed by the one or more processors, cause the computer system to obtain a decrypted version of the encrypted digital ID, including the public component of the credential and the identity data, from an approved ID provider.

18. The non-transitory computer-readable storage medium of claim 14, wherein the public component of the credential is a public key associated with a public/private key pair or a hash of a symmetric key, and wherein the encrypted digital ID is based on a certificate generated and signed by an ID provider associated with a list including a plurality of approved ID providers.

19. The non-transitory computer-readable storage medium of claim 14, wherein the identity data comprises a predetermined canonical representation including a name associated with an individual or entity.

20. The non-transitory computer-readable storage medium of claim 14, wherein the private component of the credential is a private key of a public/private key pair or a symmetric key.

21. The non-transitory computer-readable storage medium of claim 14, wherein the instructions further comprise instructions that, as a result of being executed by the one or more processors, cause the computer system to communicate with the computer-implemented service to establish an account using the pseudonym.

* * * * *